United States Patent
Goodno et al.

(10) Patent No.: US 8,922,772 B2
(45) Date of Patent: Dec. 30, 2014

(54) MULTICHANNEL POLARIZATION STABILIZATION EMPLOYING SYNCHRONOUS PHASE-LOCKING METHODS

(71) Applicant: Northrop Grumman Systems Corporation, Falls Church, VA (US)

(72) Inventors: Gregory D. Goodno, Los Angeles, CA (US); Mark E. Weber, Hawthorne, CA (US); Stanley Benjamin Weiss, IV, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 219 days.

(21) Appl. No.: 13/663,270

(22) Filed: Oct. 29, 2012

(65) Prior Publication Data
US 2013/0107257 A1 May 2, 2013

Related U.S. Application Data

(63) Continuation of application No. 13/419,054, filed on Mar. 13, 2012.

(60) Provisional application No. 61/553,600, filed on Oct. 31, 2011.

(51) Int. Cl.
| | |
|---|---|
| *G01J 4/00* | (2006.01) |
| *H01S 3/23* | (2006.01) |
| *H01S 3/13* | (2006.01) |
| *H01S 3/067* | (2006.01) |

(52) U.S. Cl.
CPC ............ *H01S 3/2383* (2013.01); *H01S 3/1307* (2013.01); *H01S 3/06754* (2013.01)
USPC .......................................... 356/364; 356/370

(58) Field of Classification Search
USPC ................................................ 356/364–370
See application file for complete search history.

(56) References Cited

U.S. PATENT DOCUMENTS

| | | | |
|---|---|---|---|
| 3,986,123 A | 10/1976 | Tirro | |
| 5,117,440 A | 5/1992 | Smith | |
| 5,986,784 A | 11/1999 | Kersey | |
| 6,748,127 B2 | 6/2004 | Nevis | |
| 7,058,098 B1 | 6/2006 | Shay | |
| 7,095,963 B2 | 8/2006 | Knaack | |
| 7,187,492 B1 | 3/2007 | Shay | |
| 7,315,575 B2 | 1/2008 | Sun | |
| 7,346,085 B1 | 3/2008 | Rothenberg | |

(Continued)

OTHER PUBLICATIONS

Goodno, Gregory D. "Multichannel polarization stabilization for coherently combined fiber laser arrays" Optice Letters, vol. 37, No. 20, pp. 4272-4274, Oct. 15, 2012.

(Continued)

*Primary Examiner* — Tri T Ton
(74) *Attorney, Agent, or Firm* — John A. Miller; Miller IP Group, PLC

(57) ABSTRACT

A multichannel optical system including a mixing device responsive to a sample beam and a reference beam that provides an in-phase signal including the mixed sample beam and reference beam having a relative phase of 0° and a quadrature phase signal including the mixed sample beam and reference beam having a relative phase of 90°. The system also includes a photodetector responsive to the quadrature phase signal that converts the quadrature phase signal to a quadrature phase electrical signal. A polarization demultiplexer circuit receives the quadrature phase electrical signal and measures the amplitude of a unique time-dependent phase dither profile having a zero time-averaged mean and a zero time-averaged correlation to the other phase dither profiles and provides a polarization amplitude signal. A polarization controller receives the polarization amplitude signal and controls the reference beam to maximize the polarization amplitude signal.

20 Claims, 5 Drawing Sheets

(56) References Cited

U.S. PATENT DOCUMENTS

| | | | |
|---|---|---|---|
| 7,411,726 | B2 | 8/2008 | Caplan |
| 7,636,525 | B1 | 12/2009 | Bontu |
| 7,683,828 | B2 | 3/2010 | Stagliano |
| 7,894,728 | B1 | 2/2011 | Sun |
| 7,899,340 | B1 | 3/2011 | Bontu |
| 7,936,999 | B1 | 5/2011 | Hawryluck |
| 8,005,368 | B2 | 8/2011 | Roberts |
| 2006/0263096 | A1 | 11/2006 | Dinu |
| 2009/0134310 | A1 | 5/2009 | Goodno |
| 2010/0215357 | A1 | 8/2010 | Westlund |
| 2011/0032603 | A1 | 2/2011 | Rothenberg |

OTHER PUBLICATIONS

Ma, Yanxing, "Coherent beam combination of 137 W fiber amplifer array using single frequency dithering technique" Optics and Lasers in Engineering, vol. 49, pp. 1089-1092.

Goodno, Gregory D. "Active phase and polarization locking of a 1.4 kW fiber amplifier" Optic Letters, vol. 35. No. 10, May 15, 2010 pp. 1542-1544.

Pouet, B., "Recent Progress in MultiChannel Quadrature Interferometer: Demonstration of a Compact Fiberized Architecture" Review of Quantitative Nondestructive Evaluation vol. 26. 2007, pp. 1668-1675.

Inoue, Kyo, "Fiber Four-Wave Mixing Suprression Using Two Incoherent Polarized Lights" IEEE Journal of Lightwave Technology, vol. 11, No. 12. Dec. 1993. pp. 2116-2122.

Noe Reinhold, "Endless Polarization Control Systems for Coherent Optics" Journal of lightwave technology, vol. 6., No. 7, Jul. 7, 1988 pp. 1199-1208.

O'Meara T.R. "The multidither principle in adaptive optics" J. Optical Society of America, vol. 67, No. 3. Mar. 1977, pp. 306-315.

90-Degree Optical Hybrid, Optoplex 90° Optical Hybrid- QPSK Demodulator (www.optoplex.com/Optical_Hybrid.htm).

(Optical Hybrid Enables Next-Generation Optical Communication) www.optoplex.com or infor@optople.com pp. 1-5.

MULTICHANNEL POLARIZATION STABILIZATION EMPLOYING SYNCHRONOUS PHASE-LOCKING METHODS

CROSS-REFERENCE TO RELATED APPLICATIONS

This application is a continuation-in-part application of U.S. patent application Ser. No. 13/419,054, titled, Multichannel Polarization Stabilizer, filed Mar. 13, 2012, which claims the benefit of the filing date of Provisional Application Ser. No. 61/553,600 titled, Multichannel Polarization Stabilizer, filed Oct. 31, 2011.

BACKGROUND

1. Field

This invention relates generally to a multichannel laser amplifier array including polarization control for each beam channel to provide co-polarization in a coherently combined beam and, more particularly, to a multichannel laser amplifier array including a single polarization detector that detects the polarization for each beam channel after the beams are combined and a polarization demultiplexer for each beam channel that measures a phase dither in each beam to provide co-polarization in the coherently combined beam.

2. Discussion

High power laser amplifiers have many applications, including industrial, commercial, military, etc. Designers of laser amplifiers are continuously investigating ways to increase the power of the laser amplifier for these applications. One known type of laser amplifier is a multichannel high power fiber laser amplifier that employs doped fibers and pump beams to generate the laser beam. Typically, a high power fiber laser amplifier uses a fiber that has an active core diameter of about 10-20 μm or larger. Modern fiber laser amplifier designs have achieved single fiber power levels up to 10 kW.

A design challenge for multichannel fiber laser amplifiers is to combine the beams from each fiber in a coherent manner so that the beams provide a single output beam having a uniform phase over the beam diameter such that the beam can be focused to a small focal spot. Focusing the combined beam to a small spot at a long distance (far-field) defines the beam quality of the beam, where the more coherent the individual fiber beams the more uniform the combined phase and the better the beam quality. Improvements in fiber laser amplifier designs increase the output power and coherency of the fiber beams in such a way as to approach the theoretical power and beam quality limit of the laser system.

The fiber beams in each channel of a multichannel fiber laser power amplifier array must also be co-polarized in the coherently combined beam to achieve high beam power and efficiency. Any depolarized light in the fiber beams will not combine coherently with the other beams and is effectively lost. The fibers comprising the fiber amplifier array induce depolarization in the fiber beams, which limits the combining efficiency of the fiber beams. It is known in the art to measure or detect the polarized power of each fiber beam in the amplifier array after the beam has been amplified and use the measured polarized power as an optimization control metric to provide feedback in a feedback loop to a polarization device to adjust the polarization of the beam to a desired polarization for all of the fiber beams. For a laser amplifier array including many fiber beams, for example, several hundred fiber beams, that are combined into a single combined beam, it is typically opto-mechanically complex to implement a large number of polarization sensors at the output of each fiber amplifier, where a separate sensor would be required for each fiber beam.

DETAILED DESCRIPTION OF THE EMBODIMENTS

The following discussion of the embodiments of the invention directed to a multichannel fiber laser amplifier array that employs polarization control of the fiber beams for multiple fiber channels using phase dithers is merely exemplarily in nature, and is in no way intended to limit the invention or its applications or uses.

Figure 1:
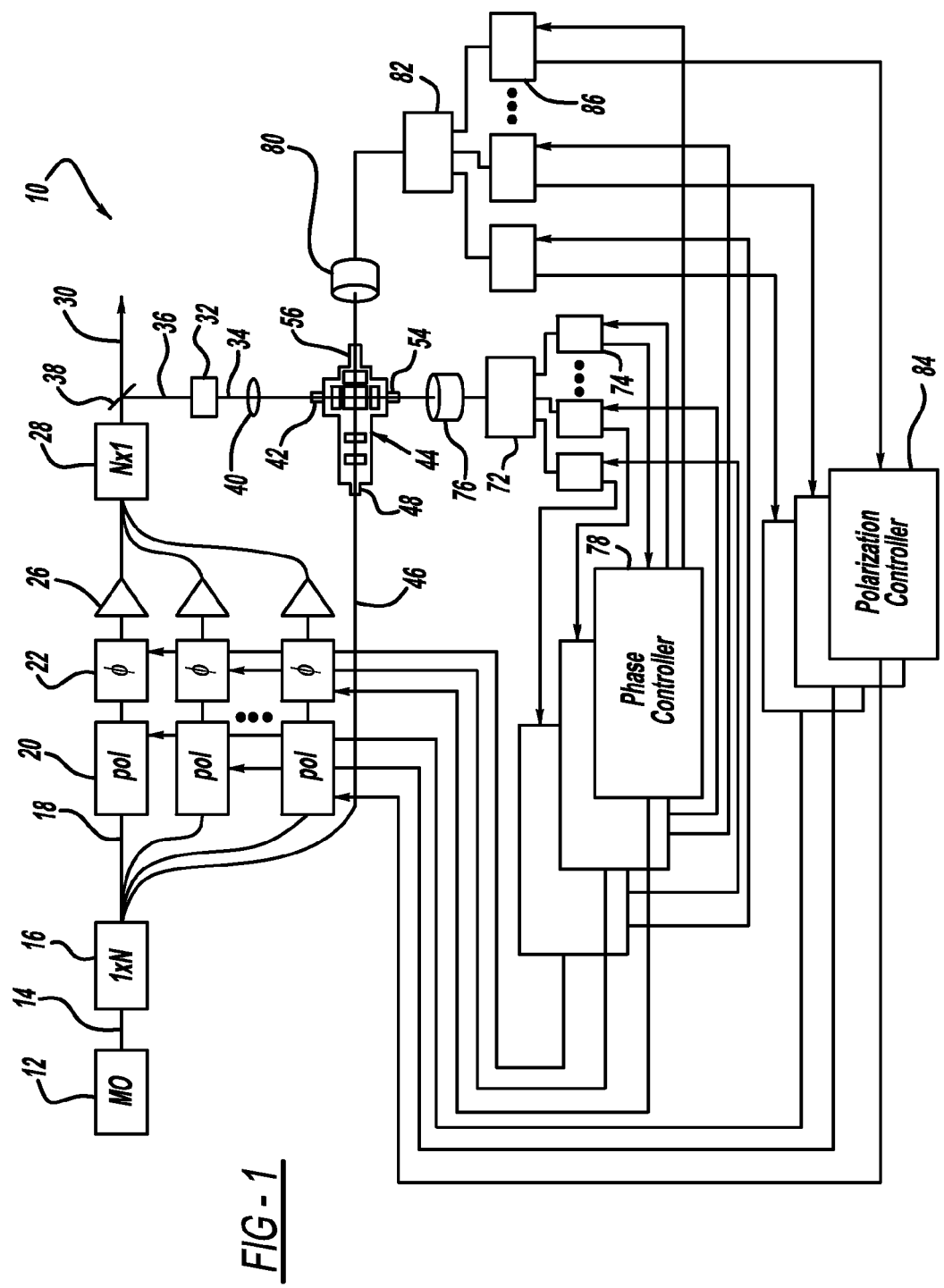
FIG. 1 is a schematic diagram of a fiber laser amplifier array including a plurality of fiber channels.

FIG. 1 is a schematic block diagram of a fiber laser amplifier array system 10 including a master oscillator (MO) 12 that generates a signal beam on an optical fiber 14. The signal beam is split into a certain number of split beams, for example, several hundred beams, by a beam splitter 16 to provide fiber beams on a plurality of fiber channels 18. Although this embodiment shows each channel being a fiber channel, in an alternate embodiment, the channel beams can travel through space instead of through fiber. The fiber beams on each fiber channel 18 are then sent through a polarization actuator 20 that provides polarization control for the beam, discussed in more detail below. The polarization actuator 20 can be any polarization actuator suitable for the purposes discussed herein many of which are known in the art. Each polarized fiber beam is then sent to a phase modulator 22 that corrects the phase of each fiber beam so that the fiber beam in each channel 18 is in phase with the other fiber beams to be combined as a single coherent beam.

For reasons that will become apparent from the discussion below, each of the phase modulators 22 also imposes a unique time-dependent phase dither onto each fiber beam that is used to identify the particular fiber beam after it is combined with the other fiber beams. As will be discussed, in one embodiment, the phase dithers can be sinusoidal functions with a unique oscillation frequency for each beam, for example, around 100 MHz. In another embodiment, the phase dithers can be a set of step-wise functions with a unique time-dependent profile for each fiber beam, for example, a set of digital step functions.

Figure 2:
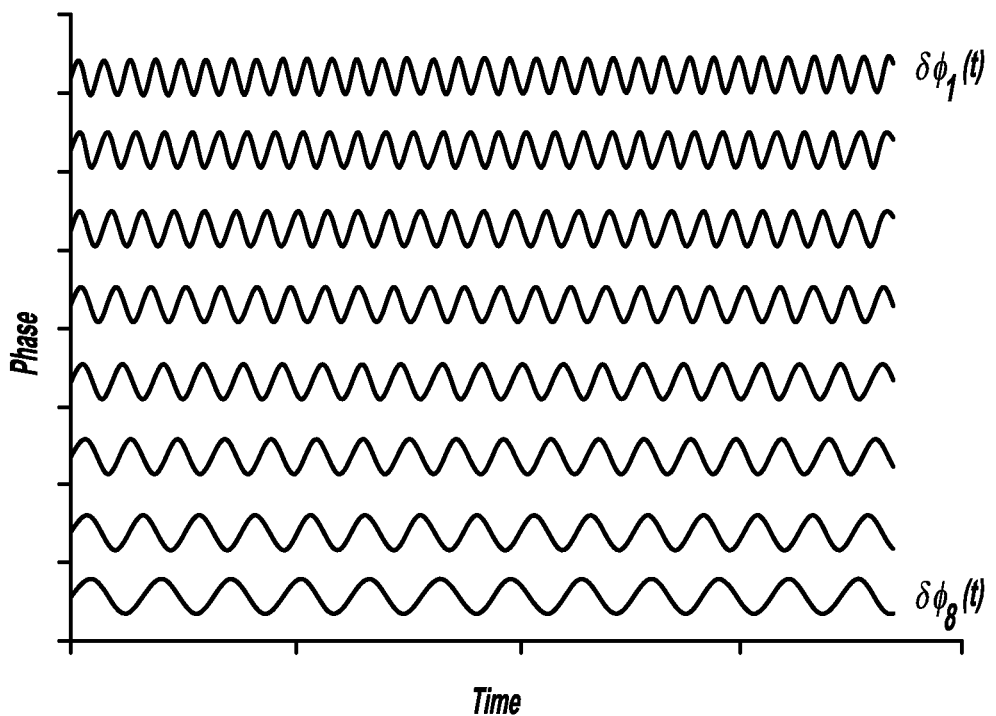
FIG. 2 is a graph with time on the horizontal axis and phase on the vertical axis showing a plurality of sinusoidal phase dithers.
Figure 3:
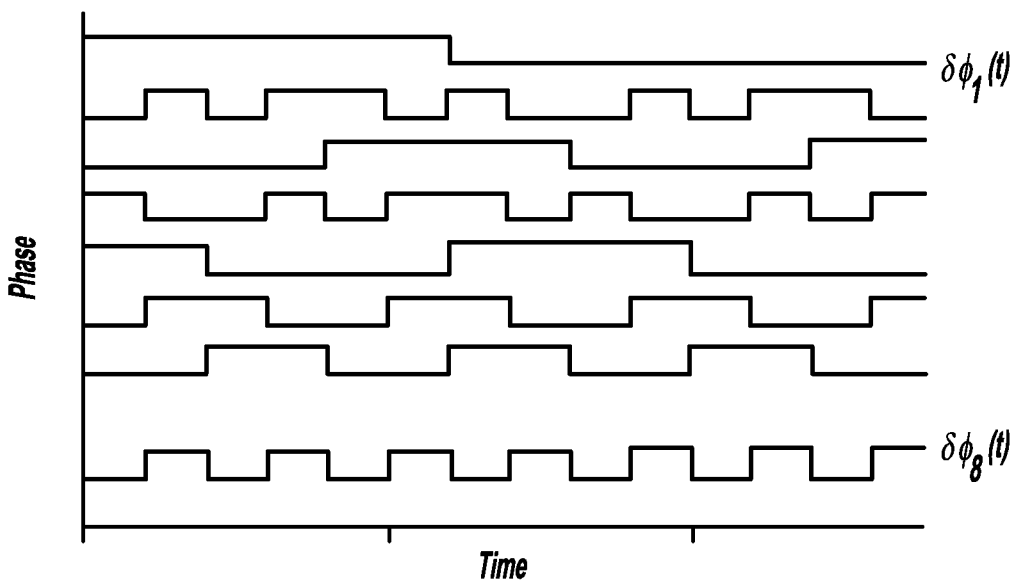
FIG. 3 is graph with time on the horizontal axis and phase on the vertical axis showing a plurality of step-wise time-dependent phase dithers.

FIG. 2 is a graph with time on the horizontal axis and phase on the vertical axis showing eight different examples of phase dithers $\delta\emptyset_n(t)$ for eight fiber beams that can be sinusoidal functions, and FIG. 3 is a graph with time on the horizontal axis and phase on the vertical axis showing eight different examples of phase dithers $\delta\emptyset_n(t)$ for eight fiber beams that are a set of step-wise functions having a unique time-dependent profile. In this example, the step-wise functions shown in FIG. 3 have orthogonality, however, any suitable random step-wise function for the fiber beams can be employed consistent with the discussion herein. In both FIG. 2 and FIG. 3, the phase dithers are vertically offset from one another for clarity, however, in actuality the time average of each phase dither is zero.

The polarized and phase controlled fiber beam is then amplified in each fiber channel 18 by a fiber amplifier 26, which can be any suitable amplifier for the purposes discussed herein. For example, the fiber amplifiers 26 can be doped amplifying portions of the fiber that receive an optical pump beam (not shown). Each amplified fiber beam is then combined by a suitable beam combiner 28 to generate a combined high power output beam 30.

As mentioned above, the various optical components in the fiber channels 18, especially the fiber amplifiers 26, induce depolarization on the fiber beams so that each fiber beam may have a different elliptical polarization when combined by the beam combiner 28. Those parts of the fiber beams that are not at the same polarization as the other fiber beams do not constructively interfere in the beam combiner 28 and the power fraction of the portion of light that is not properly polarized is lost in the combined output beam 30. In other words, only the co-polarized portions of the fiber beams will add in phase to generate the output power of the combined output beam 30.

The present invention proposes polarization control in each fiber beam by detecting the polarized power of each fiber beam after it is combined in the combined output beam 30 by using the unique time-dependent phase dither in each fiber beam. The detected polarized power can then be used to control the polarization actuators 20 of all of the fiber beams so that all of the fiber beams are co-polarized and combine to add power in the combined output beam 30. As mentioned above, known polarization controllers of multiple fiber beams require that each fiber beam include its own polarization detector to control its polarization to coherently match the polarization of each fiber beam with the polarization of the other beams.

Figure 4:
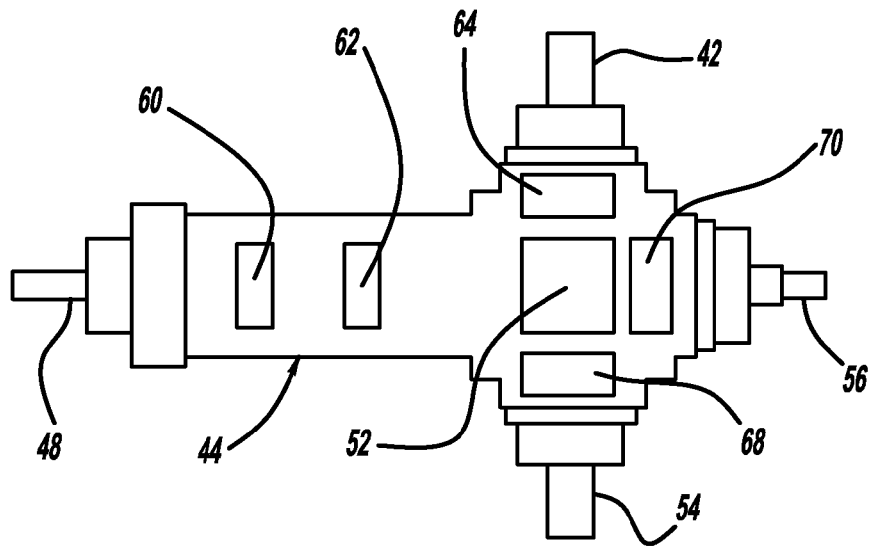
FIG. 4 is a schematic diagram of a quadrature mixing device operating as a polarized power detector in the amplifier array shown in FIG. 1.

In order to detect the phase and polarization of each of the fiber beams in the combined beam, a low power sample beam 36 is split from the combined output beam 30 by a beam splitter 38. A polarizer 32 filters the sample beam 36 to provide a polarized sample beam 34 that contains only the desired state of polarization of the combined output beam 30. The polarized sample beam 34 is directed by suitable optics 40 to a sample beam input 42 of a quadrature mixing device 44, where the polarized sample beam 34 includes phase and polarization information for each of the fiber beams. FIG. 4 is a schematic type diagram of the mixing device 44 separated from the system 10, where the mixing device 44 operates as a 90° optical hybrid whose operation, generally discussed below, is well understood by those skilled in the art. Additionally, a reference beam from the beam splitter 16 on a reference fiber 46 is provided to a reference beam input 48 of the mixing device 44. By using a series of wave plates, discussed in detail below, the polarized sample beam 34 and the reference beam interfere with each other in a polarizing beam splitter 52 to generate an in-phase signal beam at an in-phase output 54 and a quadrature phase signal beam at a quadrature phase output 56. Particularly, the reference beam is sent through a half-wave plate (HWP) 60 and a quarter-wave (QWP) plate 62 and the sample beam 32 is sent through an HWP 64. As will be appreciated by those skilled in the art, the specific configuration of the mixing device 44 shown and discussed herein is by way of a non-limiting example in that other devices may be applicable, such as a frequency shifting device, to generate an in-phase signal and a quadrature-phase signal from the polarized sample beam 34 and the reference beam.

The HWP 60 is oriented to rotate the input linear state of polarization (SOP) of the reference beam such that the SOP following the HWP 60 comprises two orthogonal linear polarization components, each of which is aligned to an axis of the polarizing beam splitter 52, with zero relative phase shift between them. The QWP 62 has its birefringent axes co-aligned with the polarization axes of the polarizing beam splitter 52, such that the QWP 62 then causes one of the linear polarization components in the reference beam to be delayed one-quarter of a wave (90°) relative to the orthogonal linear polarization component. Likewise, the HWP 64 is oriented to rotate the input linear SOP of the polarized sample beam 34 such that the SOP following the HWP 64 comprises two orthogonal linear polarization components each of which is aligned to an axis of the polarizing beam splitter 52, with zero relative phase shift between them. The reference beam that has now been separated into two orthogonal polarization components with a 90° relative phase shift and the sample beam 34 that has been separated into two linear polarization components with a 0° relative phase shift are mixed in the polarizing beam splitter 52, where one of the linear polarization components in the sample beam 34 and the 90° phase-shifted polarization component in the reference beam are directed to the quadrature output 56 and the other linear polarization components in the sample beam 34 and the reference beam are directed to the in-phase output 54.

Because the orthogonally polarized components in the sample beam 34 and the reference beam do not interfere in the polarization beam splitter 52, the two outputs of the polarizing beam splitter 52 have orthogonal polarizations. Therefore, the in-phase signal beam from the polarizing beam splitter 52 is sent through a 45° polarizer 68 and the quadrature signal beam from the polarizing beam splitter 52 is sent through a 45° polarizer 70 to make the polarization of the two beams the same. Thus, the mixing device 44 optically mixes the polarization-filtered sample beam 34 and the reference beam to include a super-position of polarization-filtered, phase-locked fiber beams from the beam combiner 28.

As mentioned above, the unique time-dependent phase dither, whether a sinusoidal function or a step-wise function, is imposed on the fiber beams by the phase modulators 22. It is known in the art to use that phase dither in each fiber beam to provide phase control so that the phase of each fiber beam is locked to the same phase value in the combined beam. The present invention proposes using those phase dithers in the fiber beams to also provide polarization control. A discussion is provided below as to how the phase dithers can provide the phase control.

Consider a coherently combined laser array comprised of N beams, each of which has quasi-stationary field amplitudes $A_k$ and phases $\varnothing_k$. A small phase dither $\delta\varnothing(t)$ is applied to each beam by a phase-locking controller. The exact nature of the dithers and error signal demodulation depends on the phase-locking algorithm. Both the sinusoidal phase dither and the step-wise phase dithers share two common properties that allow demodulation of unique error signals from a sample of the combined beam.

The phase dithers must satisfy two properties. First, the time-average of the phase dither $\delta\varnothing_j(t)$ applied to the $j^{th}$ channel is zero-mean as:

$$\frac{1}{T}\int_T \delta\varnothing_j(t)\,dt = 0, \quad (1)$$

where T is an integration time chosen sufficiently long to achieve a desired signal-to-noise ratio at the expense of control bandwidth.

Second, the phase dithers applied to the different channels j and k are statistically uncorrelated as:

$$\frac{1}{T}\int_T \delta\varnothing_j(t)\,\delta\varnothing_k(t)\,dt = \langle\delta\varnothing\rangle^2 \delta_{jk}, \quad (2)$$

where $\delta\varnothing_{jk}$ is the Kronecker delta-function, and $\langle\delta\varnothing\rangle$ is the root mean square (RMS) variation of the temporal dither, which is assumed for simplicity to be equal for all channels $\langle\delta\varnothing\rangle \ll 1$.

The phase-dithered beams are coherently superimposed on a beam combiner to obtain a coherently beam combined (CBC) output field as:

$$E(t)=\Sigma_k A_k \exp[i\varnothing_k + i\delta\varnothing_k(t)]. \quad (3)$$

The signal from a square law photodetector sampling this field superposition is:

$$V(t)=|E(t)|^2=\Sigma_{j,k} A_j A_k e^{i(\varnothing_j - \varnothing_k)+i(\delta\varnothing_j(t)-\delta\varnothing_k(t))}. \quad (4)$$

In the small dither approximation $\exp[i\delta\varnothing_k(t)]\approx 1+i\delta\varnothing_k(t)$, equation (4) can be rewritten as:

$$V(t)=\Sigma_{j,k} A_j A_k[\cos(\varnothing_j-\varnothing_k)-\sin(\varnothing_j-\varnothing_k)(\delta\varnothing_j(t)-\delta\varnothing_k(t))]. \quad (5)$$

This detector signal can be demodulated into a set of N error signals $v_n$ by constructing the time-averaged products of the photodetector signal with the normalized dithers as:

$$v_n = \frac{1}{T}\int_T V(t)\cdot\frac{\delta\varnothing_n(t)}{\langle\delta\varnothing\rangle}\,dt. \quad (6)$$

For a sinusoidal phase dither, equation (6) describes the function of an RF mixer and a low-pass filter to isolate oscillations that are synchronous with the dither frequency applied to the $n^{th}$ channel. For the step-wise phase dither profile, equation (6) is typically implemented directly using digital processors. In either case, inserting equation (5) and applying both the zero-mean and zero-correlation properties of the dithers, equations (1) and (2), respectively, yields the simple result:

$$v_n=-2\langle\delta\varnothing\rangle A_n \Sigma_{k=1}^N A_k \sin(\varnothing_n-\varnothing_k). \quad (7)$$

Equation (7) is identical to the results typically derived for sinusoidal phase control error signals, namely, that they are proportional to the sum of the pairwise phase errors between the $n^{th}$ beam and the rest of the array, weighted by the respective field amplitudes. Equation (7) also represents the long-time limit of error signals accumulated for the step-wise phase dither without phase feedback. Note that the step-wise phase-control typically applies feedback upon each loop iteration, so that equation (7) is applicable only once phases have converged to quasi-stationary values.

For simultaneous phase-locking and polarization-locking, information is extracted about the respective CBC field phases and field amplitudes from a single sample of the combined output beam. This is accomplished by mixing a polarization-filtered sample of the CBC output beam in a 90° optical hybrid with a stationary reference field derived from the MO with phase $\varnothing_{ref}=0$ and amplitude $A_{ref}$. This yields in-phase I(t) and in-quadrature Q(t) photodector signals as:

$$I(t)=|A_{ref}+E(t)|^2 \quad (8)$$

$$Q(t)=|A_{ref}+iE(t)|^2 \quad (9)$$

The in-phase signal I(t) provides feedback to a phase controller to ensure all N beams are locked in-phase with one another and with the reference with high precision, so that $(\varnothing_n-\varnothing_k)\approx(\varnothing_n-\varnothing_{ref})\approx 0$. Consequently, each of the N beams will be locked with a 90° phase shift to the reference in the quadrature output port. Consequently, the Q(t) signal will exhibit strong modulation because of the applied phase dithers. The modulation in Q(t) is a superposition of the beats between each channel's phase dither and the reference. The beating can be demodulated into N signals $q_n$ by mixing Q(t) with the phase dithers per equation (7) as:

$$q_n = -2\langle\delta\varnothing\rangle A_n \cdot \left[A_{ref}\sin\left(\varnothing_n - \varnothing_{ref} + \frac{\pi}{2}\right) + \sum_{k=1}^{n} A_k \sin(\varnothing_n - \varnothing_k)\right]. \quad (10)$$

$$\approx -2\langle\delta\varnothing\rangle A_n A_{ref}.$$

From equation (10) it can be seen that $q_n$ is proportional to its respective field amplitude $A_n$. The relative change in $q_n$ for small SOP dithers is $\delta q_n/q_n \sim \delta A_n/A_n \sim \frac{1}{2}\delta P_n/P_n$, where $P_n \sim A_n^2$ is the channel power. The proportionality to $\delta P_n$ for small changes, along with the lack of crosstalk between channels, allows $q_n$ to serve as optimization feedback signals to each channel's polarization controller.

The above analysis is general to any single-detector method for co-phasing beams that satisfies the zero-mean and zero-correlation properties of the applied dithers, i.e., equations (1) and (2).

The in-phase signal beam from the in-phase output 54 is sent to a photodetector 76 that converts the optical signal to an electrical output signal I(t). The electrical output signal I(t) of the photodetector 76 will exhibit time-dependent changes depending on the set of time-dependent phase dithers that were applied to the set of fiber beams by the phase modulators 22. Therefore, the electrical signal I(t) from the photodetector 76 includes a superposition of unique voltage modulations provided by the phase modulators 22.

The signal I(t) from the photodetector 76 is provided to a signal splitter 72 that splits the signal into a plurality of identical separate signals that are provided to a plurality of mixing circuits 74. The number of the mixing circuits 74 is the same as the number of the channels 18, where each mixing circuit 74 mixes the signal with the time-dependent phase dither for the particular channel. The output of each mixing circuit 74 is a phase error signal that is provided to a separate phase controller 78 that controls a particular phase modulator 22. Each of the phase controllers 78 provide the phase dither signal to its respective mixing circuit 74 for reasons that will become apparent from the discussion below. Each phase controller 78 provides a control signal to the respective phase modulator 22 based on the error signal output from the mixing circuit 74 to cause each of the fiber beams to be in phase with each other. This phase control process causes the phases of the sample beam 36 and the reference beam to be phase-locked, where the phase locking will be provided at both the in-phase output 54 with a zero relative phase and the quadrature phase output 56 with a 90° relative phase. This process of providing phase control in a plurality of beam channels based on a combined beam including phase dithering is well documented in the art, for example, see U.S. Pat. No. 7,058,098 issued to Shay on Jun. 6, 2006.

Each phase controller 78 attempts to null out phase differences between beams in the in-phase signal so that when the phase differences are nulled, all of the fiber beams are in phase with each other, and the output power in the combined beam 30 provided by the phase control is maximized. Because those phase differences are nulled, the signal modulations in the in-phase signal from the photodetector 76 cannot be used to provide polarization control. However, the electrical signal Q(t) from a photodetector 80 that detects the quadrature phase output 56, in which the fiber beams are locked 90° out of phase with the reference beam, will have strong modulation due to interference with the 90° phase-shifted reference beam even though the fiber beams are in phase with each other. Thus, the magnitude of the modulation in the quadrature signal Q(t) can be used to determine the polarized power fraction that a particular fiber beam is contributing to the polarization power. In other words, the magnitude of the modulation signal correlated with each time-dependent phase dither for a particular fiber channel 18 is proportional to the polarized field amplitude fraction for the fiber beam in that channel 18.

As above, the optical signal from the mixing device 44 at the quadrature output 56 is converted to an electrical signal Q(t) by the photodetector 80. The electrical signal from the photodetector 80 includes information of the polarization of each of the optical signals in each channel 18 based on the time-dependent phase dither that is applied to that channel 18. The electrical signal from the photodetector 80 is split by a signal splitter 82 and sent to a plurality of quadrature polarization demultiplexer circuits 86, one for each channel 18, that separate the amplitude of the electrical signal correlated with the particular time-dependent phase dither for the particular channel 18. Particularly, each circuit 86 extracts amplitude information for the particular time-dependent phase dither for the channel 18 it is associated with. Each of the demultiplexer circuits 86 also receives the phase dither signal from the respective phase controller 78 for that channel. That amplitude signal is then applied to a separate one of a plurality of polarization controllers 84, one for each channel 18, that utilizes the electrical signal as an optimization metric to provide feedback control to the particular polarization actuator 20 associated with that controller 84 so that the amplitude is set to a maximum. The polarization controller 84 varies the input to the polarization actuator 20 and watches how that affects the amplitude of the signal from the circuit 86 so that it can identify the maximum amplitude for that signal.

Figure 5:
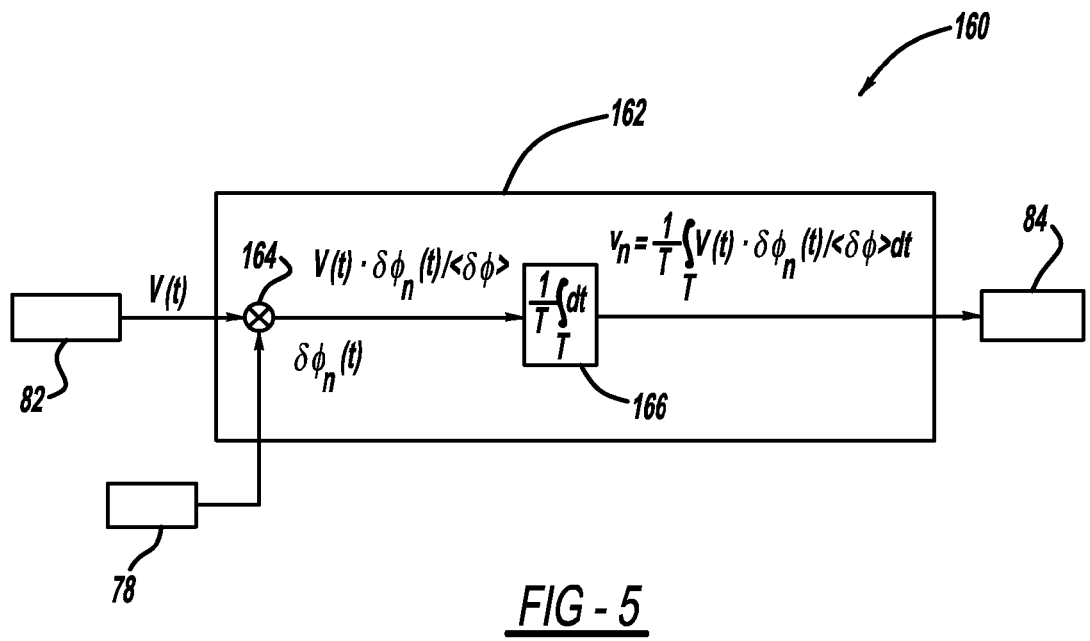
FIG. 5 is a schematic block diagram of a quadrature demultiplexer circuit that can be used for both phase control and polarization control in the fiber laser amplifier array shown in FIG. 1.

The quadrature demultiplexer circuits 86 can be any circuit suitable for the purposes discussed herein, many of which are well known by those skilled in the art. FIG. 5 is a general block diagram of a system 160 including a quadrature demultiplexer circuit 162 suitable to be used in the system 10 for each of the demultiplexer circuits 86. The circuit 162 includes a mixer 164 that receives the voltage signal V(t) from the splitter 82 at one input port and the time-dependent phase dither $\delta\varnothing_n(t)$ from the phase controller 78 for that particular channel at another input port. The mixed output signal $V(t)\cdot\delta\varnothing_n(t)/\langle\delta\varnothing\rangle$ from the mixer 164 is sent to an accumulator 166 that provides time-averaging over a time period T of the mixed signal. The output signal $v_n=1/T\int V(t)\cdot\delta\varphi nt/\langle\delta\varphi n\rangle dt$ from the accumulator 166 is an error signal that is proportional to the polarized field strength of the particular fiber beam, which is then sent to the polarization controller 84.

In the embodiment where the phase dithers are sinusoidal functions having a unique oscillation frequency for each fiber beam, the mixer 164 can be an analog RF mixer and the accumulator 166 can be a low-pass filter. In the embodiment where the phase dithers are a set of step-wise functions with a unique time-dependent profile for each fiber beam satisfying equations (1) and (2), the mixer 164 can be a digital multiplication process in a processor and the accumulator 166 can be a digital integration process in the processor. The RF mixers and other electronics that are required to generate the sinusoidal functions and provide the demultiplexing process of the functions are typically more complex and expensive than the digital operations that are required to generate the step-wise functions. It is further noted that the demultiplexer circuit 162 can also be used to provide phase control for the step-wise function phase dither embodiment where the operations are performed by a processor.

Figure 6:
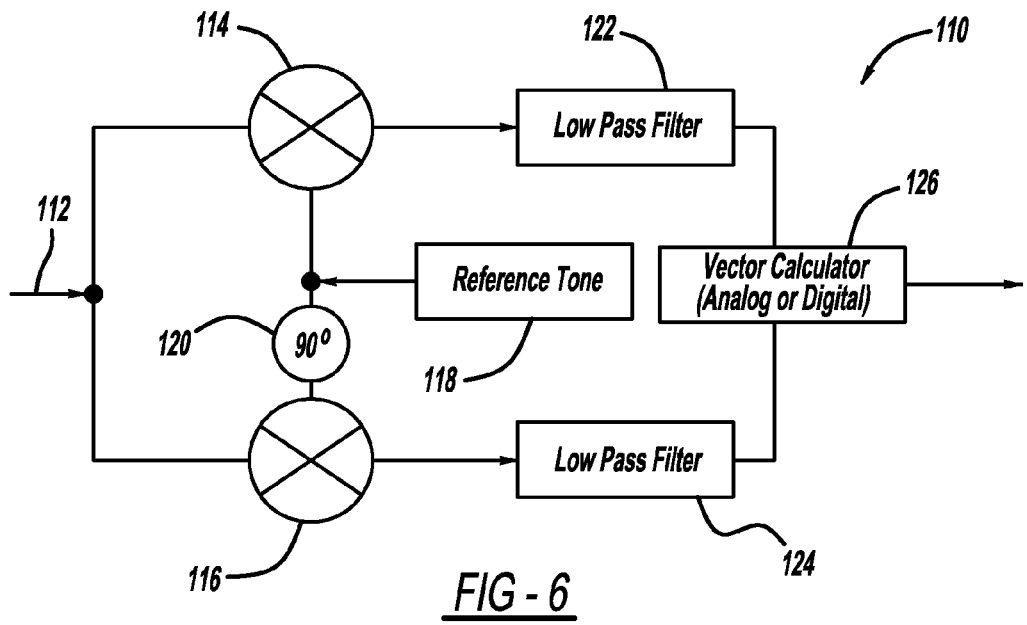
FIG. 6 is a schematic block diagram of a polarization demultiplexer circuit that can be used for polarization control in the fiber laser amplifier array shown in FIG. 1.
Figure 7:
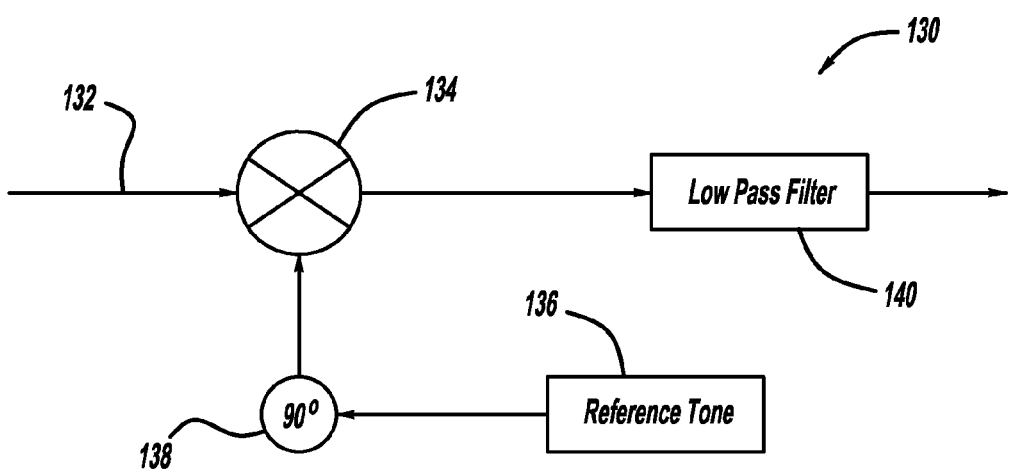
FIG. 7 is a schematic block diagram of another polarization demultiplexer circuit that can be used for polarization control in the fiber laser amplifier array shown in FIG. 1.
Figure 8:
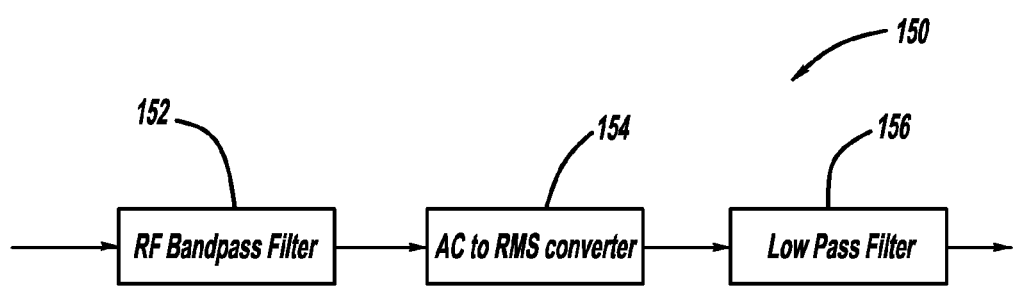
FIG. 8 is a schematic block diagram of another polarization demultiplexer circuit that can be used for polarization control in the fiber laser amplifier array shown in FIG. 1.

The demultiplexer circuit 162 is suitable for both the sinusoidal phase dither and the time-dependent step-wise phase dither. FIGS. 6-8 are examples of demultiplexer circuits suitable to be used as the demultiplexer circuit 86 in the system 10, but specifically for a sinusoidal function with a unique oscillation frequency for each fiber beam. Particularly, FIG. 6 is a schematic block diagram of a quadrature demultiplexer circuit 110 that can be used as the circuits 86. The signal from the splitter 82 is provided on line 112 to a pair of mixers 114 and 116. The reference tone provided at box 118 for the particular channel 18 associated with the circuit 86 is also provided to the mixers 114 and 116, where the reference tone is phase shifted 90° by a phase shifter 120 before it is applied to the mixer 116. The mixers 114 and 116 provide the sum and differences of the frequencies of the signal from the splitter 82 that includes all of the reference tones and the reference tone at the two phases. These sum and difference signals from the mixers 114 and 116 are low-pass filtered by low pass filters 122 and 124, respectively, to remove all of the frequencies of the tones for the other channels and noise. A vector calculator 126 squares the two signals from the filters 122 and 124 and adds them together. Therefore, no matter what the phase difference is between the reference tone and the inputs of the mixtures 114 and 116, the amplitude of the output of the vector calculator 126 will be the same. The circuit 110 has the advantage of not requiring phase control between the mixers 114 and 116 and the RF local oscillator that imposes the frequency dither on the channel 18 and provides the reference tone.

FIG. 7 is a schematic block diagram of a quadrature demultiplexer circuit 130 that can also be used as the circuits 86. The circuit 130 employs a single mixer 134 that receives the signal from the splitter 82 on line 132. The reference tone for the particular channel 18 is provided at box 136 to a 90° phase shifter 138 and the phase shifted reference tone is mixed with the signal from the splitter 82 by the mixer 134 to provide the sum and difference frequencies. In this design, the phase control between the signal from the splitter 82 and the reference tone needs to be optimized. The sum and difference signal from the mixer 134 is then low pass filtered by a low pass filter 140 to remove all of the other reference tone frequencies for the other channels 18. The circuit 130 has the advantage of requiring only a single mixer and for avoiding vector calculator electronics needed to square and sum the mixer outputs.

FIG. 8 is a schematic block diagram of a quadrature demultiplexer circuit 150 that can also be used as the circuits 86. The signal from the splitter 82 is provided to an RF band pass filter 152 that is a tightly controlled filter that only passes the frequency of the reference tone for the particular channel 18. The reference tone frequency is converted to a DC signal in an AC to root mean square (RMS) converter 154 and the converted band pass filtered signal is low pass filtered by a low pass filter 156 to remove noise.

Figure 9:
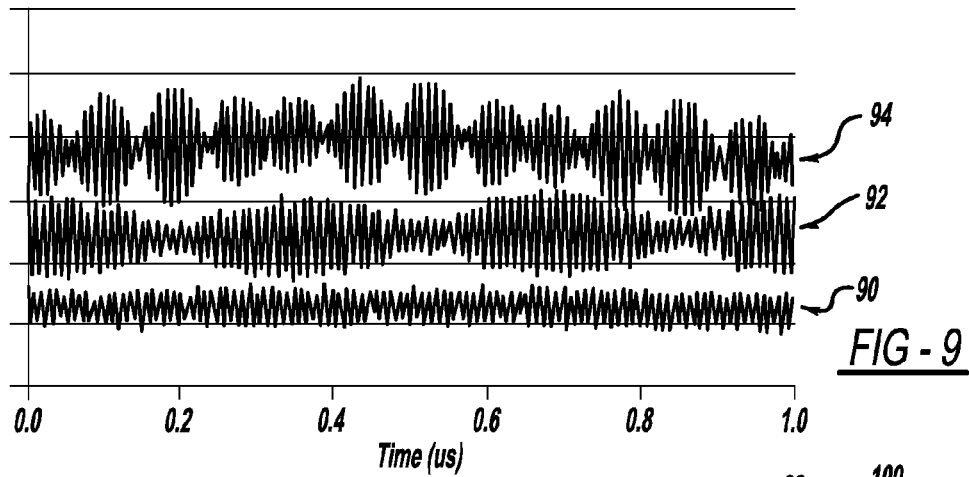
FIG. 9 is a graph with time on the horizontal axis showing quadrature photodetector signals as channels are added together.

FIG. 9 is a graph with time on the horizontal axis showing that beat frequencies in the quadrature signal from the photodetector 80 for three different combined signals can be readily indentified. Graph line 90 shows a quadrature photodetector signal of an interfered reference beam and sample beam, where the sample beam includes only a single fiber channel that has been dithered with a 100 MHz modulation signal. Graph line 92 shows a quadrature photodetector signal of an interfered reference beam and sample beam, where the sample beam has two fiber channels, and where one channel has been dithered with a 100 MHz modulation signal and the other channel has been dithered with a 103 MHz modulation signal. Graph line 94 shows a quadrature photodetector signal for an interfered reference beam and sample beam, where the sample beam has three fiber channels, and where one of the channels is modulated at 100 MHz, one of the channels is modulated at 103 MHz and a third channel is modulated at 112 MHz. FIG. 9 shows that as more fiber channels are added to the amplifier each having a unique dither frequency, those dither frequencies can be clearly identified in the combined beam at the quadrature output of the mixing device 44 as detected by the photodetector 80. Thus, the demultiplexer circuits 86 can easily filter and identify the particular frequency of each channel 18, and the polarization controllers 84 can maximize the amplitude of each particular demultiplexed signal by controlling the polarization of the particular fiber channel 18 using its polarization actuator 20.

Figure 10:
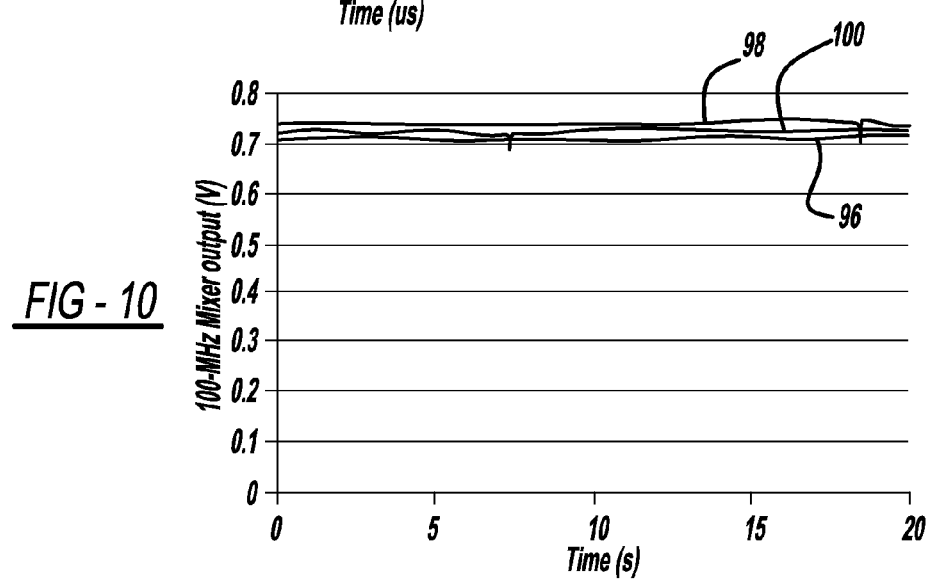
FIG. 10 is a graph with time on the horizontal axis and output in volts on the vertical axis showing polarized power extracted from the quadrature photodetector signals.

FIG. 10 is a graph with time on the horizontal axis and beat signal amplitude in volts on the vertical axis for a 100 MHz mixer showing signals extracted from the quadrature photodetector signals for all three of the examples discussed above for FIG. 6. Graph line 96 is for the quadrature photodetector signal where the sample beam includes one channel dithered at 100 MHz, graph line 98 is for the quadrature photodetector signal where the sample beam includes two channels, where one channel is dithered at 100 MHz and the other channel is frequency dithered at 103 MHz, and graph line 100 is for the quadrature photodetector signal where the sample beam includes three channels, where one channel is dithered at 100 MHz, one channel is dithered at 103 MHz and the third channel is dithered at 112 MHz. FIG. 10 shows that an RF-filtered quadrature photodetector signal at 100 MHz is proportional to the 100 MHz channels polarized power and does not change as more fiber channels are added.

Figure 11:
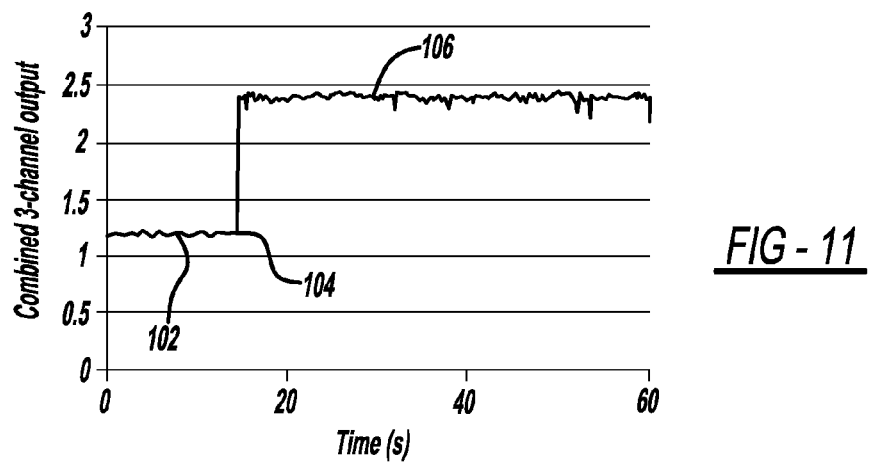
FIG. 11 is a graph with time on the horizontal axis and channel output on the vertical axis showing a closed-loop performance of a multi-channel fiber laser amplifier.

FIG. 11 is a graph with time on the horizontal axis and the detected power of the coherently combined high power output beam 30 in volts on the vertical axis showing operation of the controller 84 for the example discussed above. For the time period represented by line 102, the three channels dithered at 100 MHz, 103 MHz and 112 MHz are intentionally de-polarized and the output power in the combined beam 30 is low. The polarization controller 84 is switched on at time 104 where the power of the coherently combined output beam 30 jumps to line 106 within 200 ms.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments. One skilled in the art will readily recognize from such discussion, and from the accompanying drawings and claims, that various changes, modifications and variations can be made therein without departing from the spirit and scope of the invention as defined in the following claims.

What is claimed is:

1. An optical system comprising:
a master oscillator generating a signal beam;
a master beam splitter for splitting the signal beam into a plurality of fiber beams;
a plurality of polarization actuators each receiving one of the fiber beams, said polarization actuators providing polarization control of the fiber beams;
a plurality of phase modulators each receiving one of the fiber beams, each phase modulator modulating the fiber beam with a unique time-dependent phase dither profile signal having a zero time-averaged mean and a zero time-averaged correlation to the other phase dither profile signals, each phase modulator providing phase control of the fiber beams;
a plurality of fiber amplifiers each receiving a fiber beam from one of the phase modulators, said fiber amplifiers amplifying the fiber beams;
a beam combiner combining the amplified fiber beams into a combined beam;
a sample beam splitter for separating a low power sample beam from the combined beam;
a reference beam provided by the master beam splitter;
a mixing device responsive to the sample beam and the reference beam, said mixing device providing an in-phase optical signal including a superposition of the sample and reference beams with a relative phase difference of 0° and a quadrature phase optical signal including a superposition of the sample and reference beams with a relative phase difference of 90°;
a first photodetector responsive to the in-phase optical signal and converting the in-phase optical signal to an in-phase electrical signal;

a second photodetector responsive to the quadrature phase optical signal and converting the quadrature phase optical signal to a quadrature phase electrical signal;

a plurality of phase mixing circuits including a separate phase mixing circuit for each fiber beam and being responsive to the in-phase electrical signal, each phase mixing circuit measuring the phase of the phase dither signal for its fiber beam and providing a phase error signal;

a plurality of phase controllers including a separate phase controller for each fiber beam, each phase controller being responsive to one to the phase error signals and controlling the phase modulator for that fiber beam to null the phase error signal;

a plurality of polarization demultiplexer circuits including a separate polarization demultiplexer circuit for each fiber beam and being responsive to the quadrature phase electrical signal, each polarization demultiplexer circuit measuring correlations between the quadrature phase electrical signal and the phase dither signal of its respective fiber beam and providing a polarization amplitude signal; and a plurality of polarization controllers including a separate polarization controller for each fiber beam, each polarization controller being responsive to one to the polarization amplitude signals and controlling the polarization actuator for that fiber beam to maximize the polarization amplitude signal.

2. The system according to claim 1 wherein the unique time-dependent phase dither profile signals are sinusoidal functions having a unique RF oscillation frequency for each fiber beam.

3. The system according to claim 2 wherein each phase mixing circuit includes a single frequency mixer that mixes the in-phase signal and the phase dither signal.

4. The system according to claim 2 wherein each polarization demultiplexer circuit includes a single frequency mixer that mixes the quadrature phase signal and the phase dither frequency for the fiber beam.

5. The system according to claim 2 wherein each polarization demultiplexer circuit includes two mixers that each mixes the quadrature phase signal and the phase dither frequency for the fiber beam.

6. The system according to claim 2 wherein each polarization demultiplexer circuit includes an RF filter centered at the phase dither frequency for the fiber beam that extracts RF power at that dither frequency from the quadrature phase signal.

7. The system according to claim 1 wherein the unique time-dependent phase dither profile signals are a set of mutually uncorrelated, zero-mean digital step functions.

8. The system according to claim 7 wherein each phase mixer circuit is part of a processor that employs a digital multiplication step that multiplies the in-phase signal and the dither signal for the fiber beam.

9. The system according to claim 7 wherein each polarization demultiplexer circuit is part of a processor that employs a digital multiplication step that multiplies the quadrature phase signal and the dither signal for the fiber beam.

10. The system according to claim 1 wherein the mixing device includes a plurality of wave plates for modifying the polarization of the sample beam and the reference beam, said mixing device further including a polarizing beam splitter that mixes the polarization modified reference beam and sample beam.

11. The system according to claim 10 wherein the mixing device includes a first half-wave plate that receives the reference beam and modifies the polarization of the reference beam to provide two linear polarization components, a second half-wave plate that is responsive to the sample beam and modifies the polarization of the sample beam to provide two linear orthogonal polarization components and a quarter-wave plate that receives the reference beam from the first half-wave plate and provides a 90° phase shift to one of the linear polarized components in the reference beam, said polarizing beam splitter receiving the reference beam from the quarter-wave plate and the sample beam from the second half-wave plate and mixing the sample beam and reference beam to provide orthogonally oriented polarization components of the sample beam and reference beam for the in-phase signal and to provide orthogonally oriented polarization components of the sample beam and reference beam for the quadrature phase signal.

12. The system according to claim 11 wherein the mixing device further includes a first 45° polarizer that receives the in-phase signal from the polarizing beam splitter to provide commonly polarized sample and reference beam outputs and a second 45° polarizer that receives the quadrature phase signal from the polarizing beam splitter to provide commonly polarized sample and reference beam outputs.

13. The system according to claim 1 wherein the master beam splitter splits the signal beam into several hundred fiber beams.

14. An optical system comprising:
a mixing device responsive to a sample beam and a reference beam, said mixing device providing an in-phase optical signal including a superposition of the sample and reference beams with a relative phase difference of 0° and a quadrature phase optical signal including a superposition of the sample and reference beams with a relative phase difference of 90°;

a photodetector responsive to the quadrature phase optical signal and converting the quadrature phase optical signal to a quadrature phase electrical signal;

a polarization demultiplexer circuit responsive to the quadrature phase electrical signal, said polarization demultiplexer circuit measuring correlations between the quadrature phase electrical signal and a phase dither signal modulated on the sample beam, said phase dither signal being a zero-mean digital step function, said polarization demultiplexer circuit providing a polarization amplitude signal; and a polarization controller responsive to the polarization amplitude signal and controlling the reference beam to maximize the polarization amplitude signal.

15. The system according to claim 14 wherein the polarization demultiplexer circuit is part of a processor that employs a digital multiplication step that multiplies the quadrature phase signal and the dither value for the fiber beam.

16. The system according to claim 14 wherein the optical system is a multichannel system including multiple optical channels each having a channel beam that are combined into a combined beam, said sample beam being taken from the combined beam, each channel beam including its own unique phase dither profile signal being a zero-mean digital step function, each channel beam also including its own polarization demultiplexer circuit.

17. An optical system comprising:
a mixing device responsive to a sample beam and a reference beam, said mixing device providing an in-phase optical signal including a superposition of the sample and reference beams with a relative phase difference of 0° and a quadrature phase optical signal including a superposition of the sample and reference beams with a relative phase difference of 90°;

a photodetector responsive to the quadrature phase optical signal and converting the quadrature phase optical signal to a quadrature phase electrical signal;

a polarization demultiplexer circuit responsive to the quadrature phase electrical signal, said polarization demultiplexer circuit measuring correlations between the quadrature phase electrical signal and a phase dither signal modulated on the sample beam, said phase dither signal being a sinusoidal function having a unique RF oscillation frequency, said polarization demultiplexer circuit providing a polarization amplitude signal; and a polarization controller responsive to the polarization amplitude signal and controlling the reference beam to maximize the polarization amplitude signal.

18. The system according to claim 17 wherein the optical system is a multichannel system including multiple optical channels each having a channel beam that are combined into a combined beam, said sample beam being taken from the combined beam, each channel beam including its own unique phase dither profile signal being a sinusoidal function having a unique RF oscillation frequency, each channel beam also including its own polarization demultiplexer circuit.

19. The system according to claim 17 wherein the polarization demultiplexer circuit includes a single frequency mixer that mixes the quadrature phase signal and the phase dither frequency for the fiber beam.

20. The system according to claim 17 wherein the polarization demultiplexer circuit includes two mixers that each mixes the quadrature phase signal and the phase dither frequency for the fiber beam.

* * * * *